(12) United States Patent
Fernandez

(10) Patent No.: US 12,214,813 B2
(45) Date of Patent: Feb. 4, 2025

(54) TRACK FEATURE DETECTION USING MACHINE VISION

(71) Applicant: HARSCO TECHNOLOGIES LLC, Fairmont, MN (US)

(72) Inventor: Javier Fernandez, Columbia, SC (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 0 days.

(21) Appl. No.: 17/938,077

(22) Filed: Oct. 5, 2022

(65) Prior Publication Data

US 2023/0278605 A1    Sep. 7, 2023

Related U.S. Application Data

(63) Continuation of application No. 16/948,883, filed on Oct. 5, 2020, now Pat. No. 11,495,009, which is a continuation of application No. 15/933,004, filed on Mar. 22, 2018, now Pat. No. 10,796,192.

(60) Provisional application No. 62/475,722, filed on Mar. 23, 2017.

(51) Int. Cl.
  *B61L 23/04* (2006.01)
  *G06V 10/56* (2022.01)
  *G06V 20/56* (2022.01)
  *H04N 7/18* (2006.01)

(52) U.S. Cl.
  CPC .......... *B61L 23/042* (2013.01); *B61L 23/045* (2013.01); *G06V 10/56* (2022.01); *G06V 20/56* (2022.01); *H04N 7/18* (2013.01)

(58) Field of Classification Search
  None
  See application file for complete search history.

(56) References Cited

U.S. PATENT DOCUMENTS

| | | | |
|---|---|---|---|
| 6,356,206 | B1 | 3/2002 | Takenaga et al. |
| 6,356,299 | B1 | 3/2002 | Trosino et al. |
| 7,755,660 | B2 | 7/2010 | Nejikovsky et al. |
| 9,049,433 | B1 | 6/2015 | Prince |
| 10,796,192 | B2 | 10/2020 | Fernandez |
| 2002/0078853 | A1 | 6/2002 | Holmes et al. |

(Continued)

FOREIGN PATENT DOCUMENTS

| | | |
|---|---|---|
| DE | 102008045619 | 3/2010 |
| GB | 2473534 A | 3/2011 |

(Continued)

OTHER PUBLICATIONS

Extended European Search Report issued in corresponding Application No. 18770817.7 dated Jan. 12, 2021.

(Continued)

*Primary Examiner* — Leon Flores
(74) *Attorney, Agent, or Firm* — Norton Rose Fulbright US LLP

(57) ABSTRACT

The present disclosure generally relates to automated detection of railroad track features. Images of a railroad track are captured and analyzed to identify track features such as anchors, spikes, rail ties, tie plates, and joints. Various image processing techniques are utilized to accurately distinguish between track features and other objects in the captured images. Track features identified in the images are assigned identifiers and locations and stored in a database so that a status and/or condition of the track features may be monitored for maintenance purposes.

18 Claims, 12 Drawing Sheets

(56) References Cited

U.S. PATENT DOCUMENTS

| | | |
|---|---|---|
| 2004/0263624 A1 | 12/2004 | Nejikovsky et al. |
| 2006/0017911 A1 | 1/2006 | Villar et al. |
| 2007/0217670 A1 | 9/2007 | Bar-Am |
| 2009/0319197 A1 | 12/2009 | Villar et al. |
| 2010/0026551 A1 | 2/2010 | Szwilski et al. |
| 2010/0076631 A1 | 3/2010 | Mian |
| 2011/0181721 A1 | 7/2011 | Bloom et al. |
| 2012/0026329 A1 | 2/2012 | Vorobiev |
| 2012/0192756 A1 | 8/2012 | Miller et al. |
| 2012/0290251 A1 | 11/2012 | Groeneweg et al. |
| 2013/0070083 A1 | 3/2013 | Snead |
| 2013/0176435 A1 | 7/2013 | Haas et al. |
| 2013/0191070 A1 | 7/2013 | Kainer et al. |
| 2015/0131108 A1 | 5/2015 | Kainer et al. |
| 2017/0066459 A1 | 3/2017 | Singh |

FOREIGN PATENT DOCUMENTS

| | | |
|---|---|---|
| WO | WO 2010/104413 | 9/2010 |
| WO | WO 2011/002227 | 1/2011 |

OTHER PUBLICATIONS

Russell et al., "An evaluation of moving shadow detection techniques", *Computational Visual Media*, 2(3):195-217, 2016.

International Search Report and Written Opinion dated Apr. 18, 2012 for PCT/US2012/020925.

International Search Report and Written Opinion dated Jul. 11, 2018 for PCT/US2018/023838.

Cucchiara R et al., Detecting Moving Objects, Ghosts, and Shadows in Video Streams, *IEEE Transactions on Pattern Analysis and Machine Intelligence*, vol. 25, No. 10, Oct. 2003.

Office Action issued in corresponding European Application No. 18770817.7 dated Oct. 14, 2022.

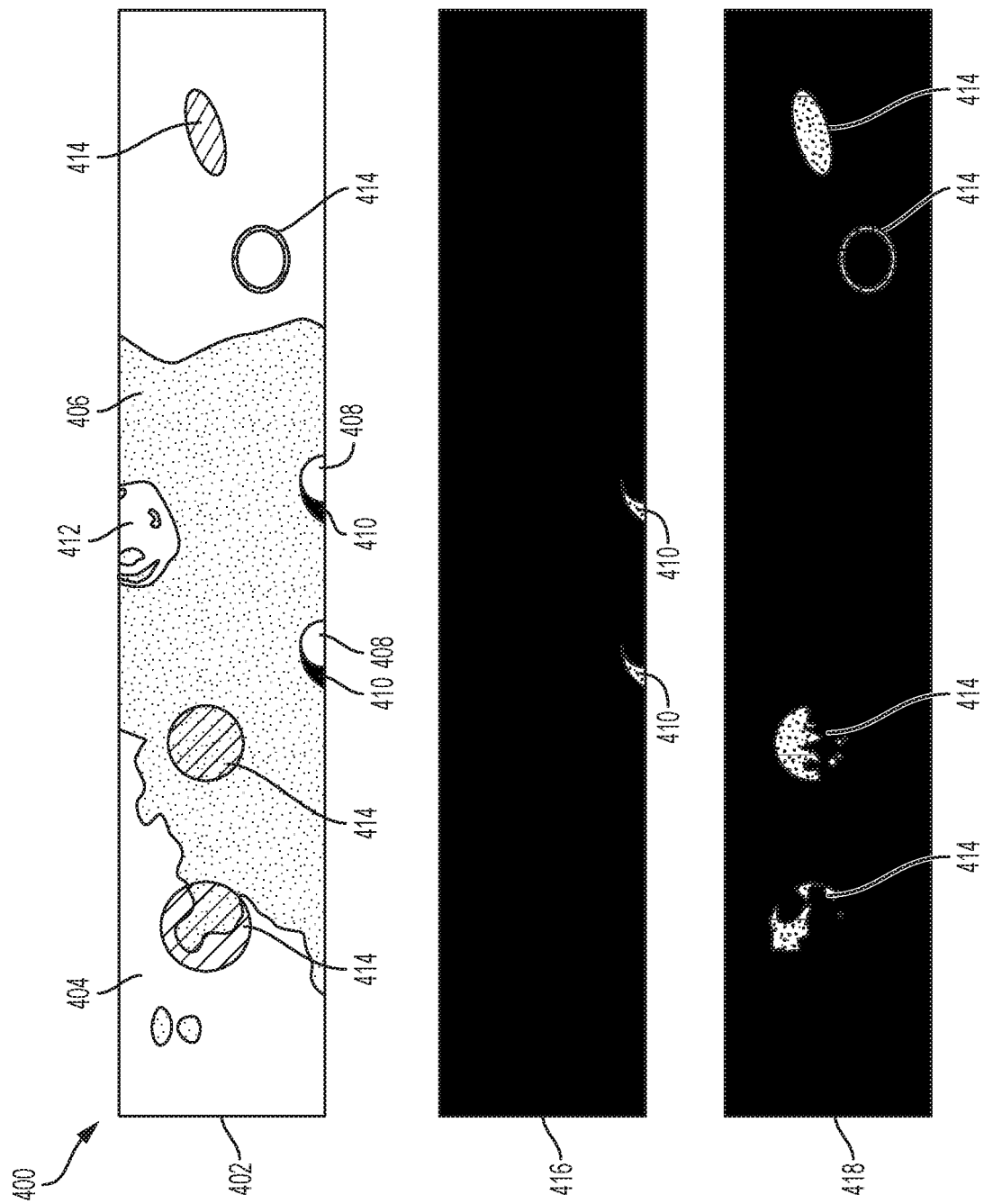

TRACK FEATURE DETECTION USING MACHINE VISION

CROSS-REFERENCE TO RELATED APPLICATION

This application is a continuation of U.S. patent application Ser. No. 16/948,883, filed Oct. 5, 2020, which is a continuation of U.S. patent application Ser. No. 15/933,004, filed Mar. 22, 2018, which claims priority to U.S. Provisional Patent Application No. 62/475,722 filed on Mar. 23, 2017, the disclosure of each of which are hereby incorporated by reference in their entirety.

BACKGROUND

Railroads are typically constructed to include a pair of elongated, substantially parallel rails held in place using spikes, anchors, rail ties, and various other hardware (e.g., track features). Over time, normal wear and tear on the railroad may require maintenance and/or replacement of track features. Traditional methods of maintaining rails and accompanying hardware often include manual inspection of the railroad tracks, which is very labor and time intensive. As such, automation of railroad track inspection is desired.

BRIEF SUMMARY

The present disclosure generally relates to a railroad track feature detection system. The system couples with an underside surface or an outside surface of a railroad chassis. The system utilizes a camera pointed at the rails on which the railroad chassis operates to capture images of the railroad track. A high intensity light is used in tandem with the camera so as to illuminate the railroad track and track features during image capture. Illuminating railroad track surfaces provides sufficient lighting for discerning between track discoloration and deliberate colored markers that are used to identify the location of various track features. Additionally, illuminating track features such as anchors and spikes casts shadows upon the rail surface. During image processing, these shadows help identify track features in the captured images.

A variety of image processing techniques are deployed. For example, color values for each pixel in a captured image may be determined and used to identify an object or an object edge in the image. Track features identified in captured images are assigned identifiers associated with a type of track feature as well as location information such as global positioning system (GPS) coordinates. Once input into a database, this assigned information may enable efficient tracking and monitoring of a status and/or condition of track features for maintenance purposes.

BRIEF DESCRIPTION OF THE DRAWINGS

Reference is now made to the following descriptions taken in conjunction with the accompanying drawings.

FIG. 4A illustrates exemplary visual processing of a captured railroad track image according to the present disclosure.

DETAILED DESCRIPTION

Various embodiments of a railroad track feature detection system are described according to the present disclosure. It is to be understood, however, that the following explanation is merely exemplary in describing the devices and methods of the present disclosure. Accordingly, several modifications, changes, and substitutions are contemplated.

Figure 1:
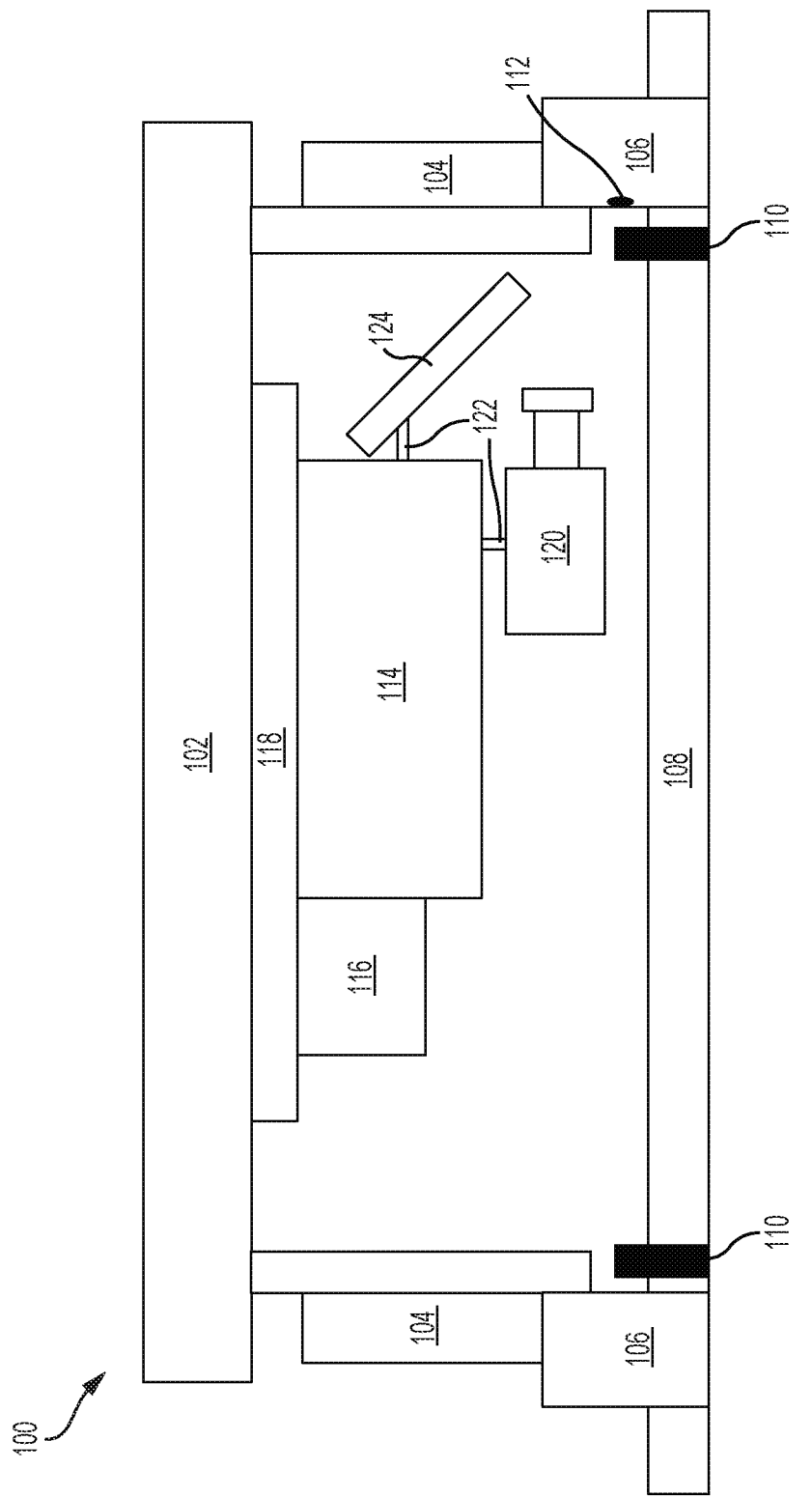
FIG. 1 illustrates an exemplary railroad track feature detection system according to the present disclosure.

As shown in FIG. 1, a railroad track feature detection system 100 may include a railroad chassis 102. In some embodiments, the railroad chassis 102 may be associated with an unmanned rail maintenance vehicle (e.g., a drone vehicle), a manned rail maintenance vehicle, and/or another rail vehicle. The railroad chassis 102 may include wheels 104 for interfacing with underlying railroad tracks (e.g., rails 106). The railroad chassis 102 may be towed behind another rail vehicle as the rail vehicle propels itself along the rails 106 of the railroad track. Alternatively, the railroad chassis 102 may be self propelled and thus may include an engine, a propulsion system, and/or another operating system (not pictured) for propelling the railroad chassis 102 along the rails 106 of the railroad track. In further embodiments, the railroad chassis 102 may take the form of a road-rail chassis or hy-rail vehicle, which may be operated on both roads and rail.

As described throughout, the railroad track may include a pair of elongated, substantially parallel rails 106, which may be coupled to a plurality of laterally extending rail ties 108. In some embodiments, a top surface of each rail tie 108 may be coupled to a bottom surface of the rails 106. The rail ties 108 may be disposed on a ballast bed of hard particulate material such as gravel (e.g., ballast, rocks, and/or the like) and may be used to support the rails 106.

The railroad track may further include a variety of track features 110 used for securing the rails 106 to rail ties 108, the ground, and/or other structures. For example, track features 110 such as spikes or anchors may be used to couple a rail 106 to an underlying rail tie 108. As described herein, a track feature 110 may refer to any type of railroad track hardware such as an anchor, a spike, a rail tie, a tie plate, a tie hole, a rail joint, a switch, a rail hole, and/or the like.

Additionally, the rails 106 may include a variety of visual markers 112 that are disposed on a surface of the rail 106. These markers 112 may be drawn or printed onto a surface of the rail 106 (e.g., an inside surface, an outer surface, a top surface, and/or the like) using paint, an adhesive, lasers, and/or other means. The markers 112 may be utilized to identify the locations of track features 110 along the rails 106. For example, a marker 112 may be disposed on an inside surface of a rail 106 at a location immediately adjacent to a track feature 110 (e.g., a rail tie or an anchor). Different color markers 112 may be used to denote different types of track features 110 and/or different sections of railroad tracks. For example, blue paint markers may be used to identify anchor locations, whereas green markers may be used to identify rail joint locations. In some embodiments, the markers 112 may even be painted or printed directly onto track features 110.

The railroad track detection system 100 may further include an enclosure 114 for housing various electronic components. For example, the enclosure 114 may house a circuit board or motherboard for executing various operations described herein. In some embodiments, the contents of the enclosure 114 may be pressurized so that dust, vegetation, and other unwanted particulate may not enter the enclosure. As such, a low-pressure compressor 116 may be operatively coupled to the enclosure 114. The compressor 116 and/or the enclosure 114 may include one or more pneumatic valves for ensuring a proper seal for maintaining a desired pressurization of the enclosure 114.

The enclosure 114 may be coupled to the railroad chassis 102 via a mounting bracket 118. The mounting bracket 118 may enable removable coupling of the enclosure 114 and the railroad chassis 102 so that the positioning of the enclosure 114 relative to the railroad chassis 102 is configurable. In some embodiments, the enclosure 114 may be coupled to an underside of the railroad chassis 102. Alternatively, the enclosure 114 may be coupled to a side surface of the railroad chassis 102.

The track feature detection system 100 may also include one or more cameras 120. As seen in FIG. 1, a camera 120 may be operatively coupled to the enclosure 114 via a mounting bracket 122. In some embodiments, the mounting bracket 122 may be pivotable so that the camera 120 may be positioned at an angle relative to the ground. The mounting bracket 122 may also be telescopic, mechanized, and/or include one or more joints for precisely positioning the camera 120.

The camera 120 may be utilized to capture images of the rails 106 as the railroad chassis 102 is propelled along the rails 106. For example, the camera 120 may be positioned in such a way as to capture images of an inside surface of the rail 106. In some embodiments, the camera 120 may be configured to capture a video feed and/or still image frames of the rails 106. The camera 120 may include visual sensors, a high-speed camera, a color camera, a global shutter camera, and/or the like. The camera 120 may be enabled to capture high-resolution images of approximately 640 pixels by 480 pixels or higher and at high speeds (e.g., approximately 12 frames per second to approximately 30 frames per second or higher). Additionally, the camera 120 and/or various sensors may also measure a height, a width, an orientation, a shape, a contour, an angle, a condition, and/or other factors associated with the rails 106, track features 110, and/or color markers 112.

To assist the camera 120 with capturing high-quality images, a light 124 may be utilized by the track feature detection system 100. The light 124 may be operatively coupled to the enclosure 114 and/or the camera 120 via a mounting bracket 122. In some embodiments, the light 124 may be positioned adjacent to the camera 120. For example, the light 124 may be positioned such that a longitudinal axis of light being projected from the light 124 may be substantially parallel (e.g., on a common plane) as an axis associated with a lens of the camera 120. In other embodiments, the light 124 may be positioned opposite the camera 120 and/or in such a way that a longitudinal axis of light being projected from the light 124 is angled relative to an axis associated with a lens of the camera 120.

The light 124 may include a high-intensity light such as a light emitting diode (LED) direct light, a laser, and/or the like. In some embodiments, the light 124 may include multiple lights positioned in different positions around the enclosure 114 and/or camera 120.

As the camera 120 captures images of the rail 106, the light 124 may be used to illuminate various track features 110 and/or markers 112 on the rails 106. For example, light emitted by the light 124 may cause track features 110 such as anchors or spikes to cast shadows on the surface of the rail 106. These shadows may be detected in captured images to identify track features 110 at various locations of the rails 106. For example, a track feature 110 that produces one shadow of a particular length at a location on the rail may be identified in a captured image as a spike, whereas a track feature 110 that produces four shadows of a particular length and at a different location on the rail may be identified in a captured image as an anchor.

Additionally, color markers 112 may be illuminated by the light 124 so that a color or design of each marker 112 may be accurately identified in captured rail images. The light 124 may also be helpful in differentiating between track features 110, color markers 112, shadows, vegetation, and/or stains (e.g., oils, hydraulic fluids, grease, and/or the like) in captured images. The camera 120 and/or the light 124 may be calibrated so as to set a frame of capture that enables accurate identification of objects (e.g., track features 110, color markers 112, shadows, vegetation, stains, and/or the like) in captured images. For example, an image frame edge and/or contour of the camera 120 may be offset and/or shifted so that clear images of the rail 106, track features 110, and/or markers 112 may be captured. In some embodiments, a bottom edge of the camera's 120 range of detection may be aligned with a foot of the rail 106. As another example, the intensity and/or direction of the light 124 may be modified so as to reduce unwanted glare and/or adjust for various weather conditions and/or amounts of dust, particulate, and/or vegetation.

Once captured by the camera 120, images of the rails 106 may be sent from the camera 120 to the enclosure 114 for processing and/or storage. Various computer hardware described herein may be included in the enclosure 114. Additionally and/or alternatively, captured images may be sent from the camera 120 and/or the enclosure to another computing device for processing and/or storage. For example, images captured by the camera 120 may be transmitted by a communication device included in the enclosure 114 to an off-site and/or cloud-based computing system for processing and/or storage. In some embodiments, captured images may be transmitted by components included in the enclosure 114 as they are received from the camera 120 (e.g., in real time). Alternatively, captured images may be transmitted at predetermined intervals, when the railroad chassis 102 is determined to be within proximity to a particular communication network, and/or at another time.

Location information associated with each captured image may also be collected by components included in the enclosure 114. This location information may be used to identify a location on the rails 106 at which a track feature 110, a color marker 112, and/or another object is detected. Location information may include GPS coordinates, X-Y coordinates, and/or other information and may be transmitted with the captured images for processing and/or analysis.

Captured images may be analyzed by computing components as described herein for the purpose of identifying track features 110 in the images. Identified track features 110 may be tagged with identifiers and corresponding location information in a database. In this manner, the locations of various track features 110 on the rails 106 may be tracked and monitored for maintenance purposes.

Various computing techniques may be deployed when performing image processing on captured images. For example, techniques such as pixel color identification and analysis, support vector machine, edge detection, histograms of gradients, background subtraction, hue/saturation/value (HSV) values, red-green-blue (RGB) color values, pattern detection, and/or other image processing techniques may be used by one or more computing processors as described herein. Scales, angles of capture, length of shutter, shutter speed, brightness, darkness, contrast, hue, saturation, and/or a variety of other characteristics may be set (e.g., selected and/or weighted) by a user or automatically by the railroad track feature detection system 100 to ensure accurate and efficient capture and processing of images.

The railroad track feature detection system 100 may identify patterns of track features 110 and/or associated shadows, markers 112 as well as location information of the same to determine which identifier is to be assigned to an identified object in a captured image. Additionally, the railroad track feature detection system 100 may determine a railroad track layout of the rails 106 based on identified track features 110.

Ultimately, the track feature detection system 100 may enable more efficient documentation and tracking of existing rails 106 and track features 110. Maps and models of the rails 106 may be generated by the track feature detection system 100, where track features 110 and/or color markers 112 are displayed digitally. Recommendations for performing maintenance on various track features 110 may be generated without requiring human inspection. For example, identifying a marker of a particular color that is associated with a particular rail tie may cause the track feature detection system 100 to recommend a maintenance vehicle to pull (e.g., replace) that particular rail tie. As such, maintenance of the rails 106 and associated track features 110 may be streamlined in an automated and cost-effective manner.

Figure 2:
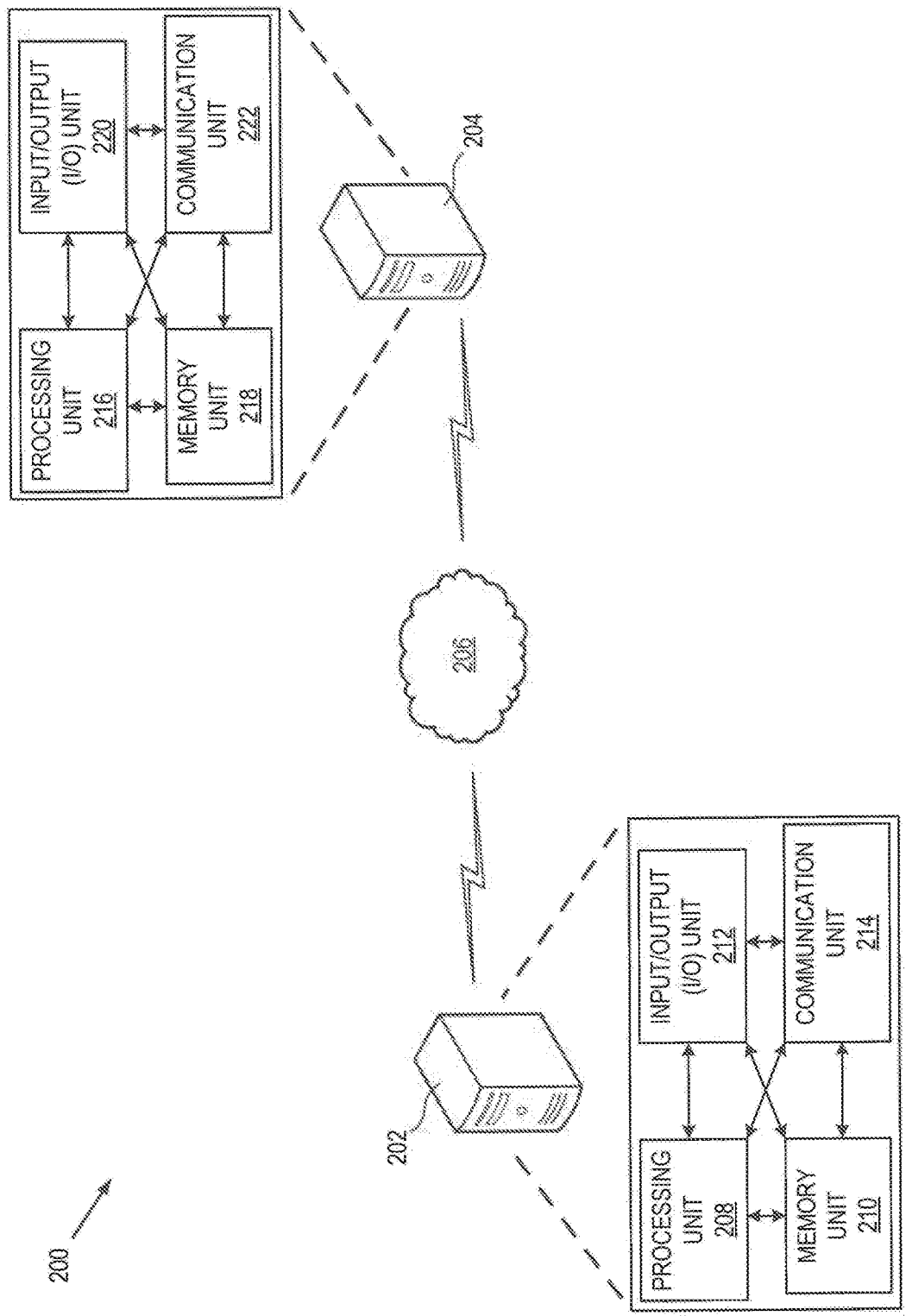
FIG. 2 illustrates an exemplary computing system according to the present disclosure.

FIG. 2 illustrates a computing system 200 for enabling the railroad track feature detection system 100 of FIG. 1 and/or other railroad track feature detection systems described herein. In some embodiments, the computing system 200 may include a first server 202 and a second server 204.

The first server 202 and the second server 204 may be communicatively coupled to one another by a network 206 as described herein. As such, a variety of data may be transmitted between the first server 202 and the second server 204 during image capture and analysis processes described herein. The network 206 may include any wireless and/or wired communications network that facilitates communication between the first server 202 and the second server 204, as well as between any other computing devices (e.g., a user's smartphone, a third party server, and/or the like). For example, the network 206 may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like. In some embodiments, the network 206 may also include a plurality of networks.

The first server 202 may be associated with the railcar chassis 102 of FIG. 1 and may be housed in the enclosure 114. For example, the first server 202 may include a computer onboard the railroad chassis 102 that enables operation of electronics included in the enclosure 114, the compressor 116, the mounting bracket 118, the camera 120, the mounting brackets 122, and/or the light 124 of FIG. 1. In some embodiments, the first server 202 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The first server 202 may also include multiple servers configured to communicate with one another and/or implement load-balancing techniques described herein.

Figure 3A:
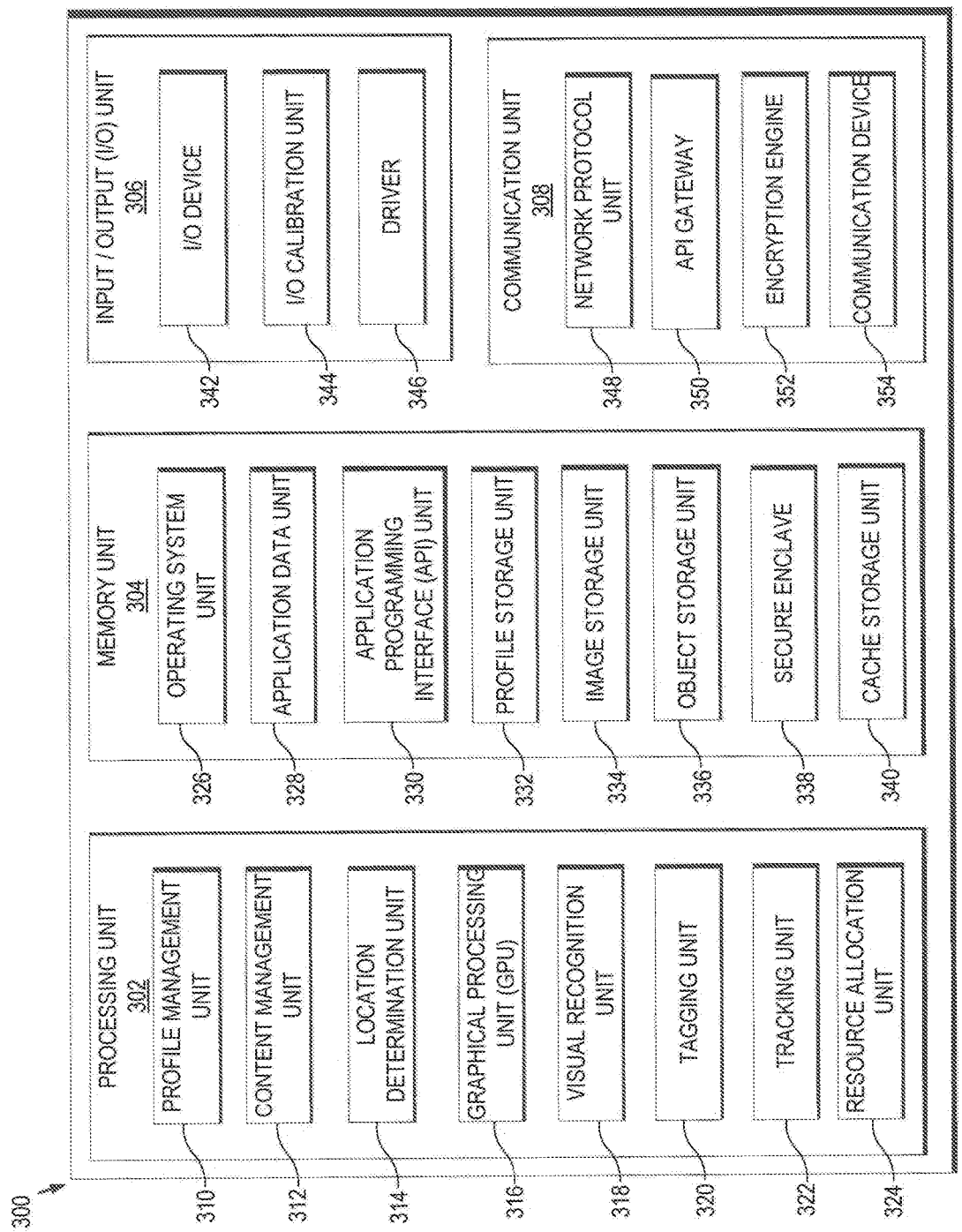
FIG. 3A illustrates an exemplary computing environment according to the present disclosure.
Figure 3B:
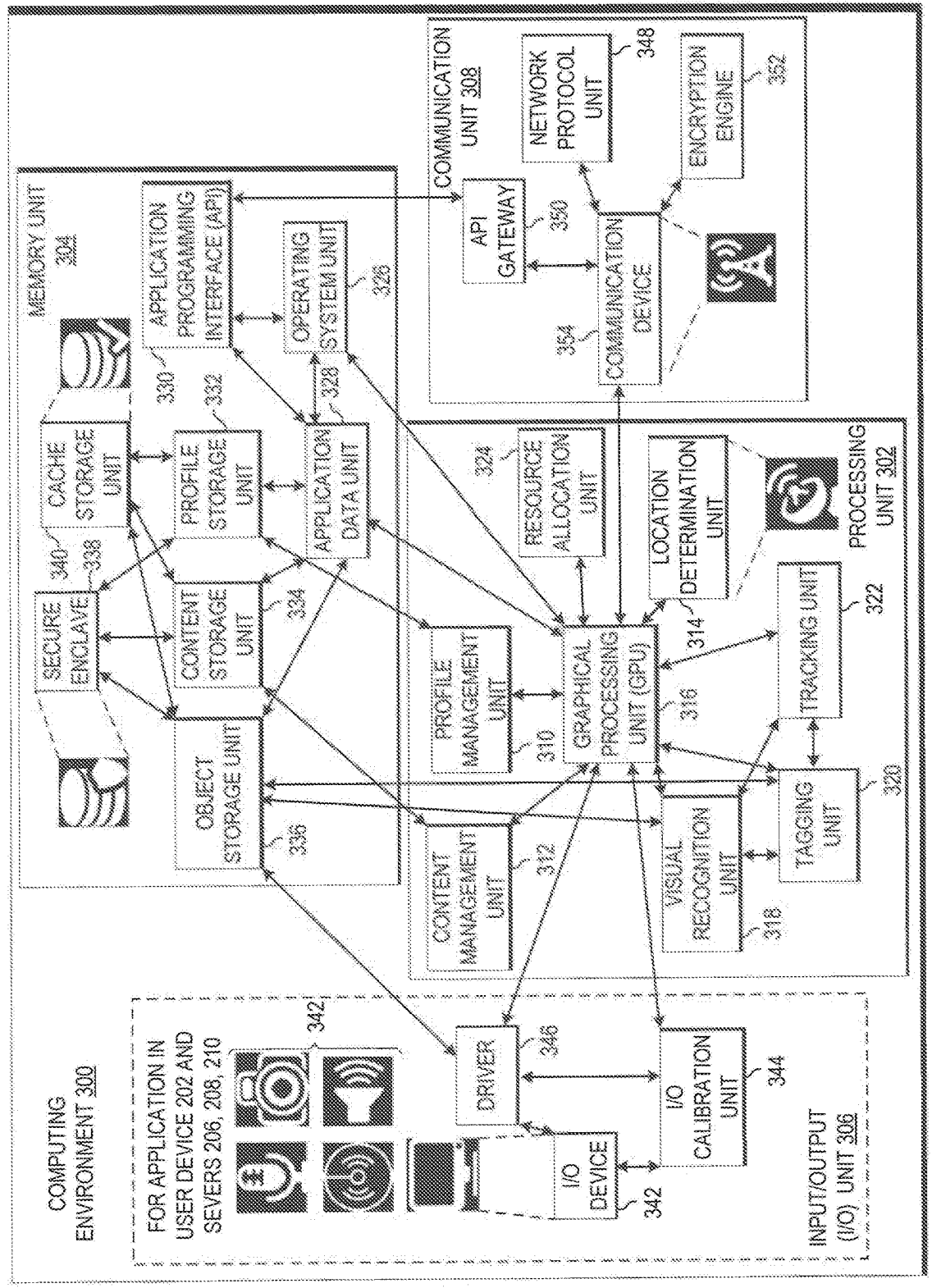
FIG. 3B illustrates an exemplary connectivity diagram of the computing environment of FIG. 3A.

The first server 202 may include various elements of a computing environment as described herein (e.g., computing environment 300 of FIGS. 3A and 3B). For example, the first server 202 may include a processing unit 208, a memory unit 210, an input/output (I/O) unit 212, and/or a communication unit 214. Each of the processing unit 208, the memory unit 210, the input/output (I/O) unit 212, and/or the communication unit 214 may include one or more subunits and/or other computing instances as described herein for performing operations associated with track feature detection.

The second server 204 may be associated with an off-site computing device for processing captured images of railroad tracks. For example, the second server 204 may include a cloud-based server that is not onboard the railroad chassis 102 of FIG. 1. In some embodiments, the second server 204 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The second server 204 may also include multiple servers configured to communicate with one another and/or implement load-balancing techniques described herein.

The second server 204 may include various elements of a computing environment as described herein (e.g., computing environment 300 of FIG. 3A and FIG. 3B). For example, the second server 204 may include a processing unit 216, a memory unit 218, an input/output (I/O) unit 220, and/or a communication unit 222. Each of the processing unit 216, the memory unit 218, the input/output (I/O) unit 220, and/or the communication unit 222 may include one or more subunits and/or other computing instances as described herein for performing operations associated with track feature detection.

FIG. 3A and FIG. 3B illustrate exemplary functional and system diagrams of a computing environment 300 for enabling railroad track feature detection and associated image processing techniques described herein. Specifically, FIG. 3A provides a functional block diagram of the computing environment 300, whereas FIG. 3B provides a detailed system diagram of the computing environment 300

Additionally, any units and/or subunits described herein with reference to the computing environment 300 of FIG. 3A and/or FIG. 3B may be included in one or more elements of FIG. 2, such as the first server 202 and/or the second server 204. The computing environment 300 and/or any of its units and/or subunits described herein may include general hardware, specifically-purposed hardware, and/or software.

The computing environment 300 may include, among other elements, a processing unit 302, a memory unit 304, an input/output (I/O) unit 306, and/or a communication unit 308. As described herein, each of the processing unit 302, the memory unit 304, the I/O unit 306, and/or the communication unit 308 may include and/or refer to a plurality of respective units, subunits, and/or elements. Furthermore, each of the processing unit 302, the memory unit 304, the I/O unit 306, and/or the communication unit 308 may be operatively and/or otherwise communicatively coupled with each other so as to facilitate railroad track feature detection and associated image analysis techniques described herein. Further, the processing unit 302, the memory unit 304, the I/O unit 306, and/or the communication unit 308 may refer to the processing unit 208, the memory unit 210, the I/O unit 212, and/or the communication unit 214 of the first server 202 of FIG. 2. Additionally, the processing unit 302, the memory unit 304, the I/O unit 306, and/or the communication unit 308 may refer to the processing unit 216, the memory unit 218, the I/O unit 220, and/or the communication unit 222 of the second server 202 of FIG. 2.

The processing unit 302 may control any of the one or more units 304, 306, 308, as well as any included subunits, elements, components, devices, and/or functions performed by the units 304, 306, 308 included in the computing environment 300. The described sub-elements of the computing environment 300 may also be included in similar fashion in any of the other units and/or devices included in the system 200 of FIG. 2. Additionally, any actions described herein as being performed by a processor may be taken by the processing unit 302 alone and/or by the processing unit 228 in conjunction with one or more additional processors, units, subunits, elements, components, devices, and/or the like. Additionally, while only one processing unit 302 may be shown in FIG. 3A and/or FIG. 3B, multiple processing units may be present and/or otherwise included in the computing environment 300 or elsewhere in the overall system (e.g., railroad track feature detection system 200 of FIG. 2). Thus, while instructions may be described as being executed by the processing unit 302 (and/or various subunits of the processing unit 302), the instructions may be executed simultaneously, serially, and/or otherwise by one or multiple processing units.

In some embodiments, the processing unit 302 may be implemented as one or more computer processing unit (CPU) chips and/or graphical processing unit (GPU) chips and may include a hardware device capable of executing computer instructions. The processing unit 302 may execute instructions, codes, computer programs, and/or scripts. The instructions, codes, computer programs, and/or scripts may be received from and/or stored in the memory unit 304, the I/O unit 306, the communication unit 308, subunits and/or elements of the aforementioned units, other devices and/or computing environments, and/or the like.

In some embodiments, the processing unit 302 may include, among other elements, subunits such as a profile management unit 310, a content management unit 312, a location determination unit 314, a graphical processing unit (GPU) 316, a visual recognition unit 318, a tagging unit 320, a tracking unit 322, and/or a resource allocation unit 324. Each of the aforementioned subunits of the processing unit 302 may be communicatively and/or otherwise operably coupled with each other.

The profile management unit 310 may facilitate generation, modification, analysis, transmission, and/or presentation of a profile associated with a railroad track. For example, the profile management unit 310 may operate a database associated with a railroad track and may manage information associated with the railroad track and/or a railroad chassis as described herein. The profile management unit 310 may also control and/or utilize an element of the I/O unit 232 to enable the capture and/or storage of images of a railroad track. The profile management unit 310 may receive, process, analyze, organize, and/or otherwise transform any data received from the user and/or another computing element so as to generate a profile of a railroad track that includes route information, status information, track feature information, maintenance information, marker information (e.g., color values), and/or location information of the same.

The content management unit 312 may facilitate generation, modification, analysis, transmission, and/or presentation of user interfaces for controlling the railroad track feature detection system described herein. For example, the content management unit 312 may control the audio-visual environment and/or appearance of application data during execution of various processes. Media content for which the content management unit 312 may be responsible may include advertisements, images, text, themes, audio files, video files, documents, and/or the like. In some embodiments, the content management unit 312 may also interface with a third-party content server and/or memory location.

The location determination unit 314 may facilitate detection, generation, modification, analysis, transmission, and/or presentation of location information. Location information may include global positioning system (GPS) coordinates, a mile marker, an Internet protocol (IP) address, a media access control (MAC) address, geolocation information, an address, a port number, a zip code, a server number, a proxy name and/or number, device information (e.g., a serial number), and/or the like. In some embodiments, the location determination unit 314 may include various sensors, a radar, and/or other specifically-purposed hardware elements for enabling the location determination unit 314 to acquire, measure, and/or otherwise transform location information. In some embodiments, location-acquiring hardware may be included in the enclosure 114 of the system 100 of FIG. 1 for determining locations of the railroad chassis 102, track features 110, and/or color markers 114 during operation.

The GPU unit 316 may facilitate generation, modification, analysis, processing, transmission, and/or presentation of images of railroad tracks captured by the camera 120 of FIG. 1. In some embodiments, the GPU unit 316 may be utilized to render visual content for presentation on a user device, analyze a captured image, and/or the like. The GPU unit 316 may also include multiple GPUs and therefore may be configured to perform and/or execute multiple processes in parallel.

The visual recognition unit 318 may facilitate analysis and/or processing of captured images for the purpose of identifying objects associated with a railroad track. For example, the visual recognition unit 318 may be utilized for identifying track features and/or markers in captured images. In some embodiments, the visual recognition unit 318 may include GPUs and/or other processing elements so as to enable efficient analysis of images in either series or parallel. The visual recognition unit 318 may utilize a variety of image analysis techniques such as pixel value determination, pixel value comparison, edge detection, support vector machine, histogram of gradients, background subtraction, HSV, object recognition, pattern detection, shadow recognition, image filtering, video and/or image frame sampling, image splicing, image reconstruction, error detection, video reconstruction, and/or the like to accurately identify objects of interest in captured rail images. The visual recognition unit 318 may determine a confidence score of how likely an object identified in an image is indeed a track feature or color marker. For example, the determined confidence score associated with an identified object may be required to exceed a threshold in order for an identifier and/or location information may be assigned to the identified object. The visual recognition unit 318 may also be configured to filter out unwanted objects in a captured image. For example, an oil stain on a rail or vegetation that has been identified in a captured image may be filtered out using one or more image processing techniques. As another example, an object identified in an image that is smaller than a predetermined size (e.g., a number of pixels) may be filtered out of the image and/or otherwise ignored by the visual recognition unit 318.

The tagging unit 320 may facilitate the accurate assignment of object identifiers and/or location information to identified objects in captured rail images. Various identifiers such as metadata, color values, numerical values, and/or other tags may be assigned to identified objects in a database.

The tracking unit 322 may facilitate the monitoring, analysis, and/or processing of identifiers and/or location information associated with identified objects. The tracking unit 322 may monitor a status of an identified track feature at a particular location in such a manner that maintenance for that track feature can be recommended. For example, based on when an image of the track feature was last captured and/or a condition of the track feature detected in the image, the tracking unit 322 may generate an alert or recommendation for manually inspecting the track feature. Alternatively, the tracking unit 322 may generate instructions for a drone rail maintenance vehicle to repair and/or inspect the track feature.

The resource allocation unit 324 may facilitate the determination, monitoring, analysis, and/or allocation of computing resources throughout the railroad track feature detection system described herein. For example, the railroad track feature detection system may facilitate a high volume of (e.g., multiple) communication connections between a large number of supported railroad chassis and/or associated processing servers (e.g., the first server 202 and/or the second server 204 of FIG. 2). As such, computing resources of the computing environment 300 (and/or any subunit of the aforementioned units) such as processing power, data storage space, network bandwidth, and/or the like may be in high demand at various times during operation. Accordingly, the resource allocation unit 324 may be configured to manage the allocation of various computing resources as they are required by particular units and/or subunits of the computing environment 300 and/or other computing environments. In some embodiments, the resource allocation unit 324 may include sensors and/or other specially-purposed hardware for monitoring performance of each unit and/or subunit of the computing environment 300, as well as hardware for responding to the computing resource needs of each unit and/or subunit. In some embodiments, the resource allocation unit 324 may utilize computing resources of a second computing environment separate and distinct from the computing environment 300 to facilitate a desired operation.

For example, the resource allocation unit 324 may determine a number of simultaneous communication connections and/or incoming requests for data and/or image processing. The resource allocation unit 324 may then determine that the number of simultaneous communication connections and/or incoming requests for meets and/or exceeds a predetermined threshold value. Based on this determination, the resource allocation unit 324 may determine an amount of additional computing resources (e.g., processing power, storage space of a particular non-transitory computer-readable memory medium, network bandwidth, and/or the like) required by the processing unit 302, the memory unit 304, the I/O unit 306, the communication unit 308, and/or any subunit of the aforementioned units for enabling safe and efficient operation of the computing environment 300 while supporting the number of simultaneous communication connections and/or incoming requests. The resource allocation unit 324 may then retrieve, transmit, control, allocate, and/or otherwise distribute determined amount(s) of computing resources to each element (e.g., unit and/or subunit) of the computing environment 300 and/or another computing environment.

In some embodiments, factors affecting the allocation of computing resources by the resource allocation unit 324 may include the number of ongoing communication connections and/or other communication channel connections, a number of image analysis and/or reporting processes, a duration of time during which computing resources are required by one or more elements of the computing environment 300, and/or the like. In some embodiments, computing resources may be allocated to and/or distributed amongst a plurality of second computing environments included in the computing environment 300 based on one or more factors mentioned above. In some embodiments, the allocation of computing resources of the resource allocation unit 324 may include the resource allocation unit 324 flipping a switch, adjusting processing power, adjusting memory size, partitioning a memory element, transmitting data, controlling one or more input and/or output devices, modifying various communication protocols, and/or the like. In some embodiments, the resource allocation unit 324 may facilitate utilization of parallel processing techniques such as dedicating a plurality of GPUs included in the processing unit 302 for processing a high-quality video stream of a captured rail images.

In some embodiments, the memory unit 304 may be utilized for storing, recalling, receiving, transmitting, and/or accessing various files and/or information during operation of the computing environment 300. For example, the memory unit 304 may be utilized for storing image frames, video streams, storing, recalling, and/or updating railroad track profile information, marker information, track feature information, and/or the like. The memory unit 304 may include various types of data storage media such as solid state storage media, hard disk storage media, and/or the like. The memory unit 304 may include dedicated hardware elements such as hard drives and/or servers, as well as software elements such as cloud-based storage drives. For example, the memory unit 304 may include various subunits such as an operating system unit 326, an application data unit 328, an application programming interface (API) unit 330, a profile storage unit 332, a content storage unit 334, an object storage unit 336, a secure enclave 338, and/or a cache storage unit 340.

The memory unit 304 and/or any of its subunits described herein may include random access memory (RAM), read only memory (ROM), and/or various forms of secondary storage. RAM may be used to store volatile data and/or to store instructions that may be executed by the processing unit 302. For example, the data stored may be a command, a current operating state of the computing environment 300, an intended operating state of the computing environment 300, and/or the like. As a further example, data stored in the memory unit 304 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 304 may include one or more databases for storing any data described herein. Additionally or alternatively, one or more secondary databases located remotely from the computing environment 300 may be utilized and/or accessed by the memory unit 304.

The operating system unit 326 may facilitate deployment, storage, access, execution, and/or utilization of an operating system utilized by the computing environment 300 and/or any other computing environment described herein. In some embodiments, the operating system may include various hardware and/or software elements that serve as a structural framework for enabling the processing unit 302 to execute various railroad track feature detection and/or image processing operations described herein. The operating system unit 326 may further store various pieces of information and/or data associated with operation of the operating system and/or the computing environment 300 as a whole, such as a status of computing resources (e.g., processing power, memory availability, resource utilization, and/or the like), runtime information, modules to direct execution of operations described herein, and/or the like.

The application data unit 328 may facilitate deployment, storage, access, execution, and/or utilization of an application utilized by the computing environment 300 and/or any other computing environment described herein (e.g., the first server 202 and/or the second server 204 of FIG. 2). For example, users may be required to download, access, and/or otherwise utilize a software application on a computing device in order for various operations described herein to be performed. As such, the application data unit 328 may store any information and/or data associated with the application. Information included in the application data unit 328 may enable a user and/or computer processor to execute various operations described herein. The application data unit 328 may further store various pieces of information and/or data associated with operation of the application and/or the computing environment 300 as a whole, such as a status of computing resources (e.g., processing power, memory availability, resource utilization, and/or the like), runtime information, modules to direct execution of operations described herein, and/or the like.

The API unit 300 may facilitate deployment, storage, access, execution, and/or utilization of information associated with APIs of the computing environment 300 and/or any other computing environment described herein. For example, the computing environment 300 may include one or more APIs for enabling various devices, applications, and/or computing environments to communicate with each other and/or utilize the same data. Accordingly, the API unit 330 may include API databases containing information that may be accessed and/or utilized by applications and/or operating systems of other devices and/or computing environments. In some embodiments, each API database may be associated with a customized physical circuit included in the memory unit 304 and/or the API unit 330. Additionally, each API database may be public and/or private, and so authentication credentials may be required to access information in an API database.

The profile storage unit 332 may facilitate deployment, storage, access, and/or utilization of information associated with profiles of railroad tracks, track features, and/or markers. For example, the profile storage unit 332 may store a track profile, identification information, marker information, track feature information, location information, and/or metadata associated with a railroad track and/or a railroad chassis. In some embodiments, the profile storage unit 332 may communicate with the profile management unit 310 to receive and/or transmit information associated with a railroad profile.

The content storage unit 334 may facilitate deployment, storage, access, and/or utilization of information associated with requested content by the computing environment 300 and/or any other computing environment described herein. For example, the content storage unit 334 may store one or more user interfaces, application information, captured images of rails, video feeds of rails, processed image frames, audio content, and/or metadata to be presented to a user and/or otherwise utilized during operations described herein. In some embodiments, the content storage unit 334 may communicate with the content management unit 312 to receive and/or transmit content files.

The object storage unit 336 may facilitate deployment, storage, access, analysis, and/or utilization of information associated with objects identified in image. For example, the object storage unit 336 may store location information and/or identifiers associated with objects identified in captured image frames. In some embodiments, the object storage unit 336 may communicate with the GPUs 316, the visual recognition unit 318, the tagging unit 320, and/or the tracking unit 322 to facilitate analysis of any stored image frame and/or associated information.

The secure enclave 338 may facilitate secure storage of data. In some embodiments, the secure enclave 338 may include a partitioned portion of storage media included in the memory unit 304 that is protected by various security measures. For example, the secure enclave 338 may be hardware secured. In other embodiments, the secure enclave 338 may include one or more firewalls, encryption mechanisms, and/or other security-based protocols. Authentication credentials of a user may be required prior to providing the user access to data stored within the secure enclave 338.

The cache storage unit 340 may facilitate short-term deployment, storage, access, analysis, and/or utilization of data. In some embodiments, the cache storage unit 340 may serve as a short-term storage location for data so that the data stored in the cache storage unit 340 may be accessed quickly. In some embodiments, the cache storage unit 340 may include RAM and/or other storage media types that enable quick recall of stored data. The cache storage unit 340 may include a partitioned portion of storage media included in the memory unit 304.

The I/O unit 306 may include hardware and/or software elements for enabling the computing environment 300 to receive, transmit, and/or present information. For example, elements of the I/O unit 306 may be used to capture images of railroad tracks, display images of railroad tracks, receive user input from a user via a user device, present information to a user, and/or the like. In this manner, the I/O unit 306 may enable the computing environment 300 to interface with a railroad track and/or a human user. As described herein, the I/O unit 306 may include subunits such as an I/O device 342, an I/O calibration unit 344, and/or video driver 346.

The I/O device 342 may facilitate the receipt, transmission, processing, presentation, display, input, and/or output of information as a result of executed processes described herein. In some embodiments, the I/O device 342 may include a plurality of I/O devices. For example, the I/O device 342 may include a variety of elements that enable capturing of images of railroad tracks such as a camera, a sensor, a light, and/or the like. The I/O device 342 may also include hardware for interfacing with a user, such as a keyboard, a touchscreen, a button, a sensor, a biometric scanner, a laser, a microphone, a camera, and/or another element for receiving and/or collecting input from a user. Additionally and/or alternatively, the I/O device 342 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 342 may communicate with one or more elements of the processing unit 302 and/or the memory unit 304 to execute operations described herein.

The I/O calibration unit 344 may facilitate the calibration of the I/O device 342. For example, the I/O calibration unit 344 may detect and/or determine one or more settings of the I/O device 342, and then adjust and/or modify settings so that the I/O device 342 may operate more efficiently.

In some embodiments, the I/O calibration unit 344 may utilize a driver 346 (or multiple drivers) to calibrate the I/O device 342. For example, a video driver 346 may be installed on a computer that enables a camera to capture images of railroad tracks in a particular manner. In some embodiments, the I/O device 342 may be calibrated by the I/O calibration unit 344 based on information included in the driver 346.

The communication unit 308 may facilitate establishment, maintenance, monitoring, and/or termination of communications (e.g., a communication connection) between computing devices of the railroad track feature detection system described herein. The communication unit 308 may further enable communication between various elements (e.g., units and/or subunits) of the computing environment 300. In some embodiments, the communication unit 308 may include a network protocol unit 348, an API gateway 350, an encryption engine 352, and/or a communication device 354. The communication unit 308 may include hardware and/or software elements.

The network protocol unit 348 may facilitate establishment, maintenance, and/or termination of a communication connection between computing environment 300 and another computing environment (e.g., the first server 202 and the second server 204 of FIG. 2) by way of a network. For example, the network protocol unit 348 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication between the computing environment 300 and any other device, as well as any element internal to the computing environment 300, may include transforming and/or translating data from being compatible with a first communication protocol to being compatible with a second communication protocol. In some embodiments, the network protocol unit 348 may determine and/or monitor an amount of data traffic to consequently determine which particular network protocol is to be used for establishing a video communication connection, transmitting data, and/or performing other operations described herein.

The API gateway 350 may facilitate the enablement of other devices and/or computing environments to access the API unit 330 of the memory unit 304 of the computing environment 300. For example, a user device may access the API unit 330 via the API gateway 350. In some embodiments, the API gateway 350 may be required to validate user credentials associated with a user of a user device prior to providing access to the API unit 330 to the user. The API gateway 350 may include instructions for enabling the computing environment 300 to communicate and share information with another device.

The encryption engine 352 may facilitate translation, encryption, encoding, decryption, and/or decoding of information received, transmitted, and/or stored by the computing environment 300. Using the encryption engine, each transmission of data may be encrypted, encoded, and/or translated for security reasons, and any received data may be encrypted, encoded, and/or translated prior to its processing and/or storage. In some embodiments, the encryption engine 352 may generate an encryption key, an encoding key, a translation key, and/or the like, which may be transmitted along with any data content.

The communication device 354 may include a variety of hardware and/or software specifically purposed to enable communication between the computing environment 300 and another device, as well as communication between elements of the computing environment 300. In some embodiments, the communication device 354 may include one or more radio transceivers, chips, analog front end (AFE) units, antennas, processing units, memory, other logic, and/or other components to implement communication protocols (wired or wireless) and related functionality for facilitating communication between the computing environment 300 and any other device. Additionally and/or alternatively, the communication device 354 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

FIG. 4A depicts an exemplary visual processing 400 of a captured railroad track image. An image 402 of a surface of a rail 404 may be captured by a camera of the railroad track feature detection system. Water 406 has been poured on the rail 404 to show how the railroad track feature detection system described herein may differentiate between blemishes and/or stains on the rail 404 from other objects.

The image 402 may be taken by the camera in tandem with a light shining on the rail surface. By using a light, track features 408 may be illuminated for easy visual detection. Additionally, the light allows the track features 408 to cast shadows 410 on the surface of the rail 404. The light also illuminates markers 412 painted onto the surface of the rail 404 so that its exact color may be easily identified. Additional markers 414 have been superimposed on the image 402 for simulation.

As seen in processed image 416, with all white, color, and/or light removed, a "negative" image is produced. This negative image highlights the shadows 410 cast by the track features 408. In this manner, track features may be identified using shadow detection and/or background subtraction techniques. Using these techniques, the water stain 406 and markers 412, 414 are filtered out of the processed image 416.

In processed image 418, the water 406, track features 408, shadows 410, and marker 412 have been filtered out. The processed image 418 shows how different color markers may be identified by the railroad track feature detection system. A range of colors can be detected in captured images. Markers of a color that falls within a desired range may appear more solid, like the rightmost marker 414 in the processed image 418, than markers of a color that fall outside a desired range (e.g., marker 412). In some embodiments, each color may be assigned a range of hue values associated with a color. For example, on a color wheel with 360 degrees of colors, a first color may be assigned to degrees 1-10, whereas a second color may be assigned to degrees 11-20, and so on. The railroad track feature detection system may be configured to search captured images for a particular color and/or color range. For example, the railroad track feature detection system may search captured images for colors associated with a hue within the range of degrees 1-20. In this manner, HSV processing may identify color markers. The railroad track feature detection system may also cycle through multiple hue and/or color ranges at a particular location so that markers of multiple colors may be identified. As described above, different color markers may be associated with different track features.

Additionally, shadows may be utilized to identify track features. For example, a number of shadows, a size or length of a shadow, a location of a shadow, and/or other characteristics may be used to identify track features.

Figure 4B:
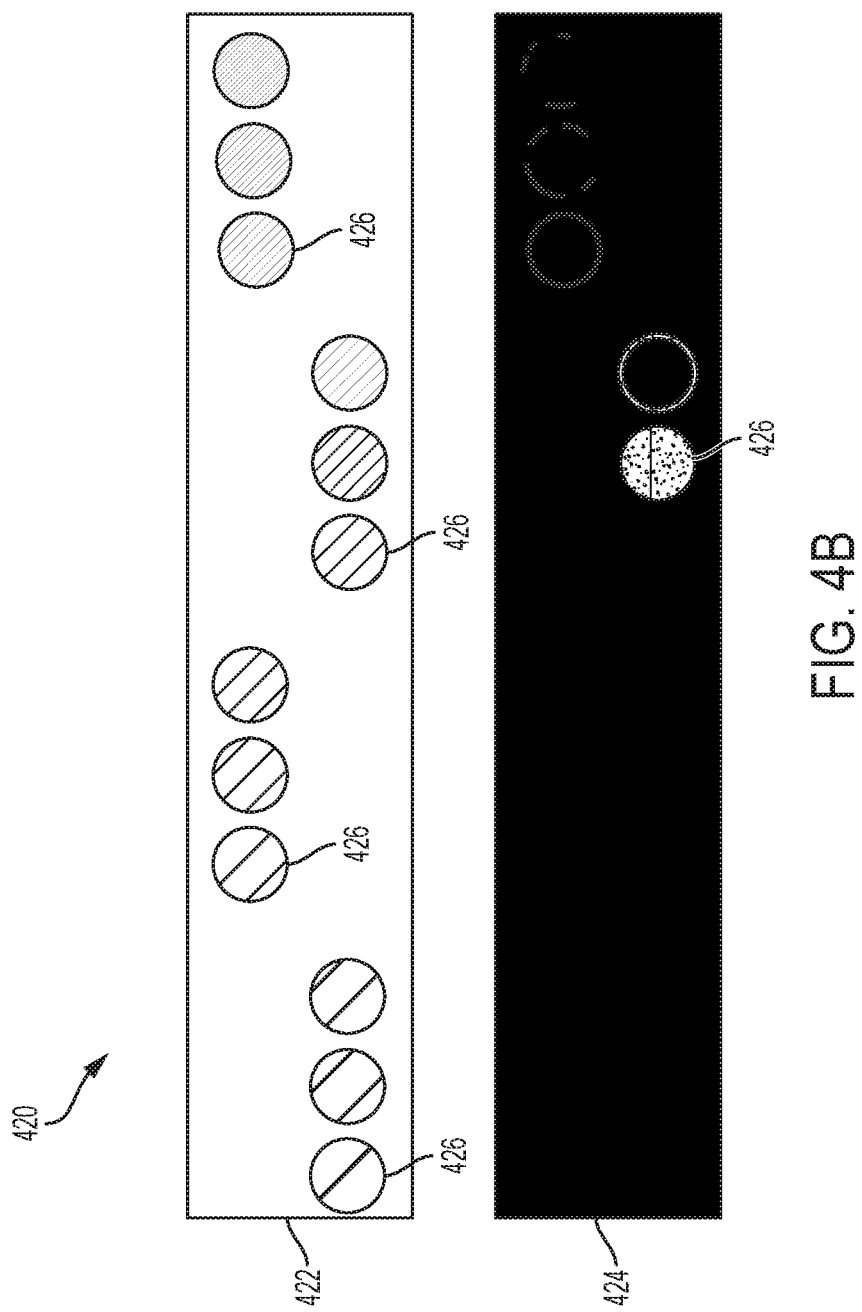
FIG. 4B illustrates exemplary visual processing of a captured railroad track image according to the present disclosure.

FIG. 4B depicts an exemplary visual processing 420 of a captured railroad track image. Similar to above, captured image 422 shows superimposed markers 426 of various colors. Processed image 424 shows how markers of some colors are filtered out using HSV processing, whereas markers of other colors are easily identified. When searching for markers of a particular color, the railroad track feature detection system may search based on hue values only (e.g., saturation, value, brightness, transparency, and/or the like may be set to zero). Alternatively, a variety of values associated with a color may be utilized for searching for markers of particular colors. Using edge detection (e.g., at locations where neighboring pixels have color and/or hue values that exceed a predetermined threshold), the railroad track feature detection system may identify a contour, a moment, and/or outline of a track feature, a shadow, a marker, and/or another object.

Figure 4C:
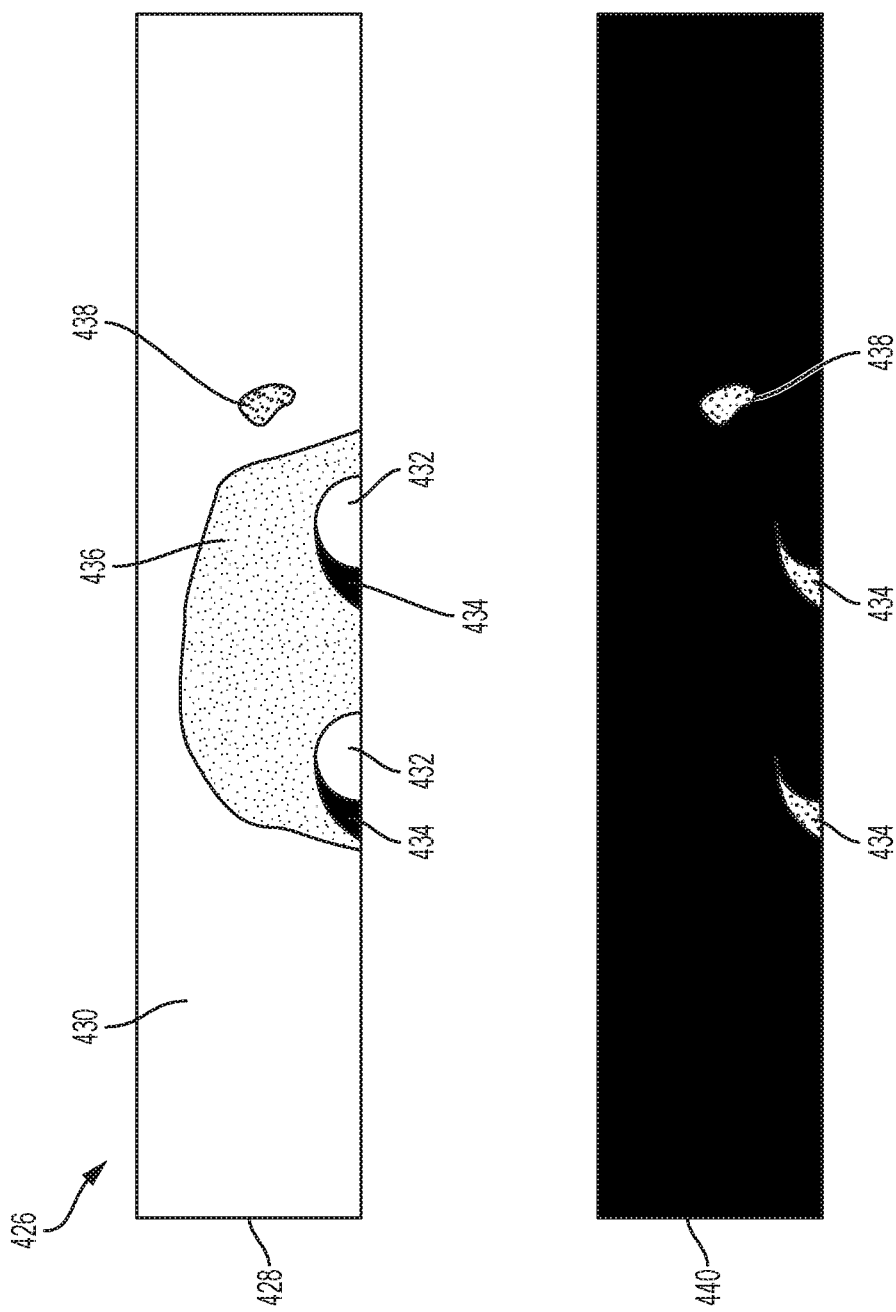
FIG. 4C illustrates exemplary visual processing of a captured railroad track image according to the present disclosure.

FIG. 4C depicts an exemplary visual processing 426 of a captured railroad track image. Similar to above, captured image 428 illustrates an image of a surface of a rail 430 with two track features 432, each casting a shadow 434 on the surface of the rail 430. The rail 430 also includes a water stain 436 and a grease stain 438.

Processed image 440 shows how the grease stain 438 may be incorrectly identified as a track feature shadow 434 by the railroad track feature detection system. Error detection processes may be utilized to eliminate errors. For example, the grease stain 438 may be filtered out from an image frame based on its size. If the grease stain 438 (or another object that should not be identified as a track feature and/or marker) is smaller than a predetermined threshold size, then the railroad track feature detection system may filter out the grease stain 438.

Figure 5A:
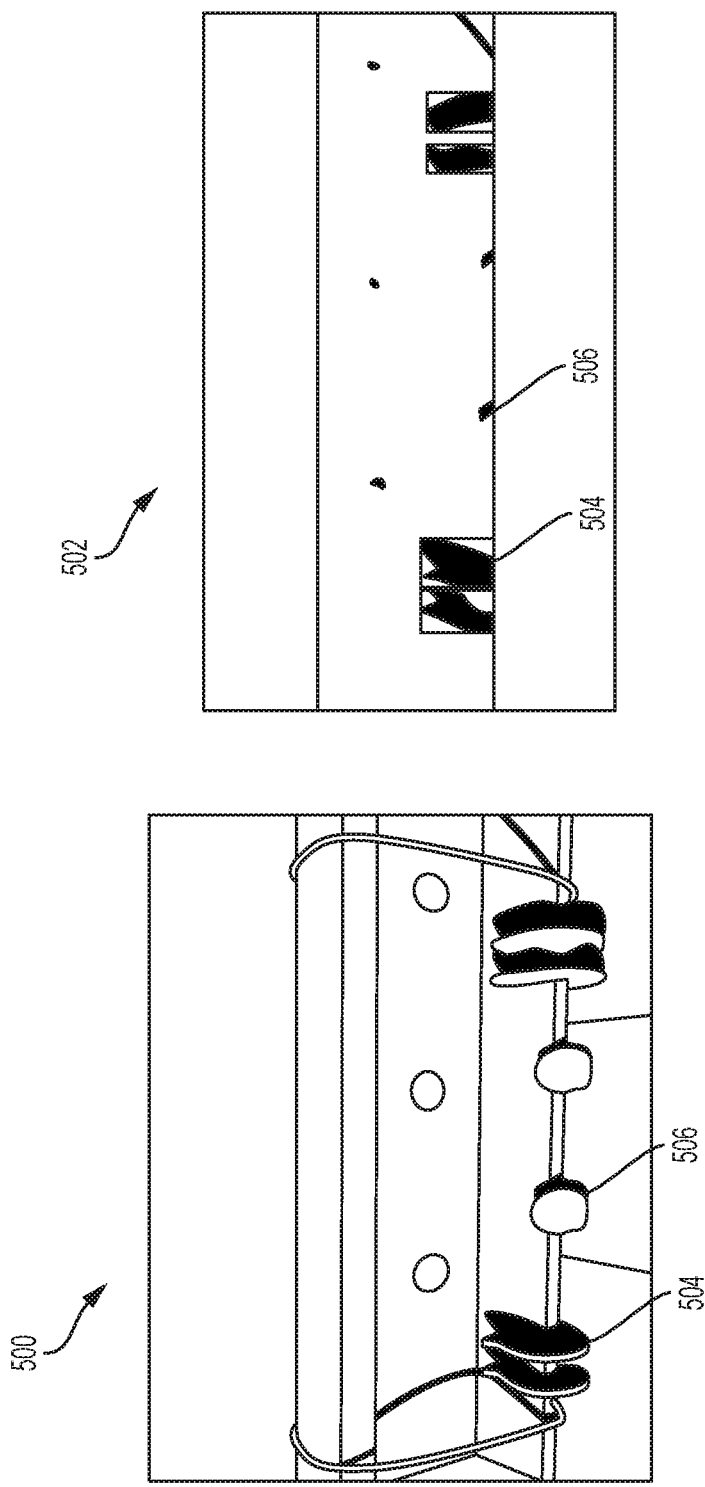
FIG. 5A illustrates an exemplary captured image and an associated processed image of a first anchor type according to the present disclosure.

It is to be appreciated that the processed images according to the present disclosure can identify various anchor types, such as Ericson, stead, unit, woodings and improved fair anchor types. FIG. 5A illustrates an exemplary captured image 500 and an associated processed image 502 of a first anchor type 504 according to the present disclosure. The boxes in the processed image 502 indicate an identified track feature (e.g., an anchor). Other track features shown in the captured image 500, such as spikes 506, may also be identified in the processed image 502.

Figure 5B:
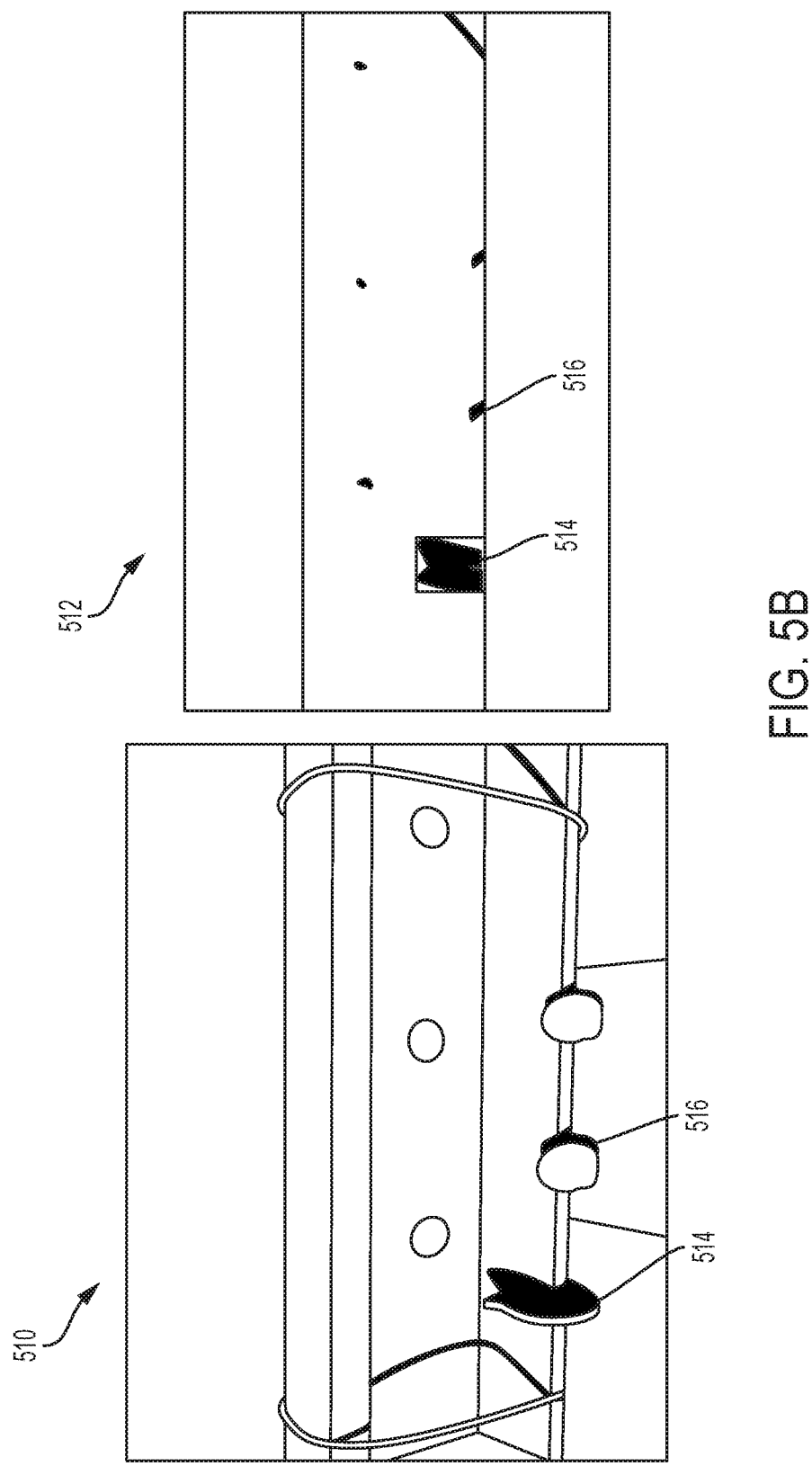
FIG. 5B illustrates an exemplary captured image and an associated processed image of a second anchor type according to the present disclosure.

FIG. 5B illustrates an exemplary captured image 510 and an associated processed image 512 of a second anchor type 514 according to the present disclosure. The box in the processed image 512 indicates an identified track feature (e.g., an anchor). Other track features shown in the captured image 510, such as spikes 516, may also be identified in the processed image 512.

Figure 5C:
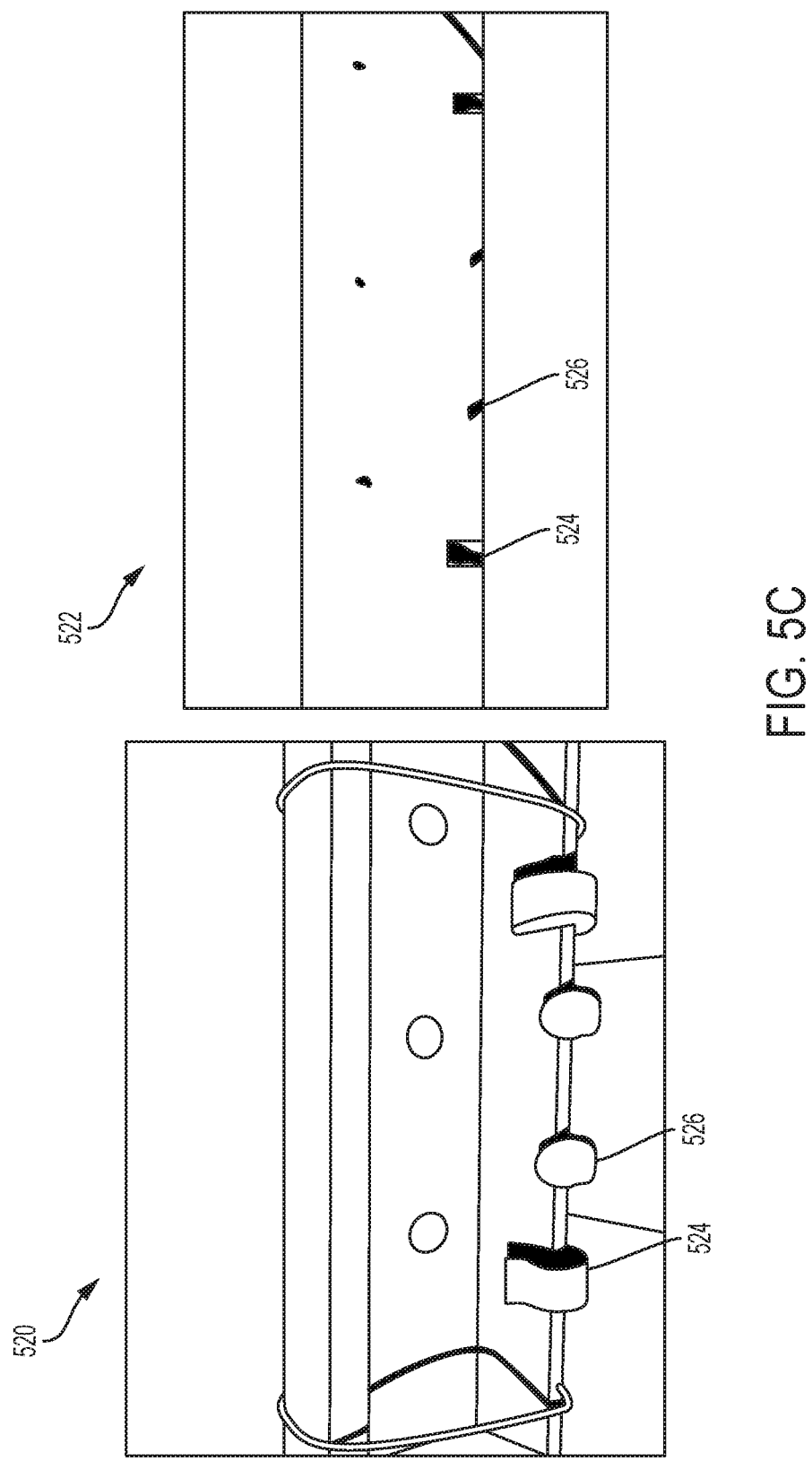
FIG. 5C illustrates an exemplary captured image and an associated processed image of a third anchor type according to the present disclosure.

FIG. 5C illustrates an exemplary captured image 520 and an associated processed image 522 of a third anchor type 524 according to the present disclosure. The boxes in the processed image 522 indicate an identified track feature (e.g., an anchor). Other track features shown in the captured image 520, such as spikes 526, may also be identified in the processed image 522.

Figure 5D:
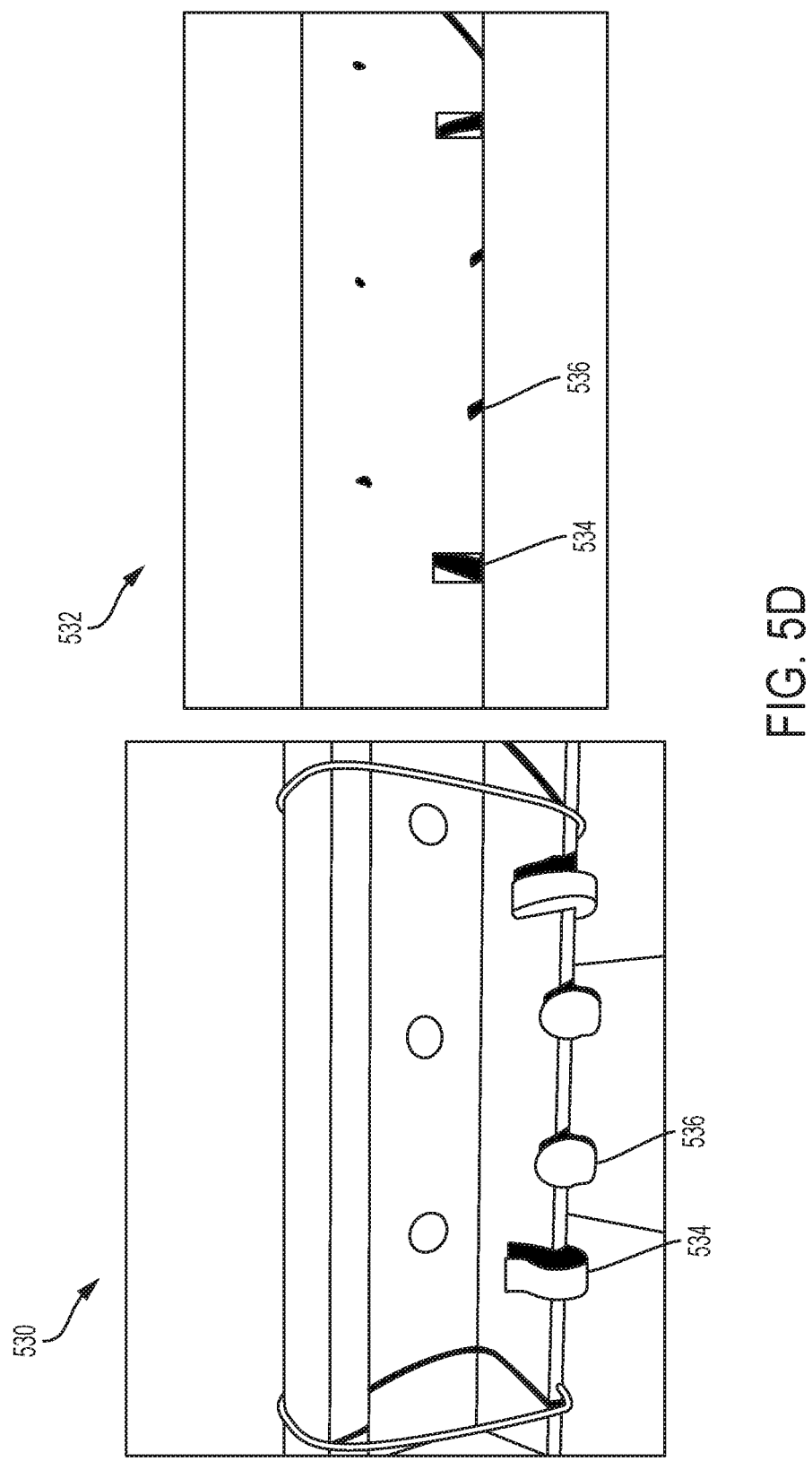
FIG. 5D illustrates an exemplary captured image and an associated processed image of a fourth anchor type according to the present disclosure.

FIG. 5D illustrates an exemplary captured image 530 and an associated processed image 532 of a fourth anchor type 534 according to the present disclosure. The red boxes in the processed image 532 indicate an identified track feature (e.g., an anchor). Other track features shown in the captured image 530, such as spikes 536, may also be identified in the processed image 532.

Figure 5E:
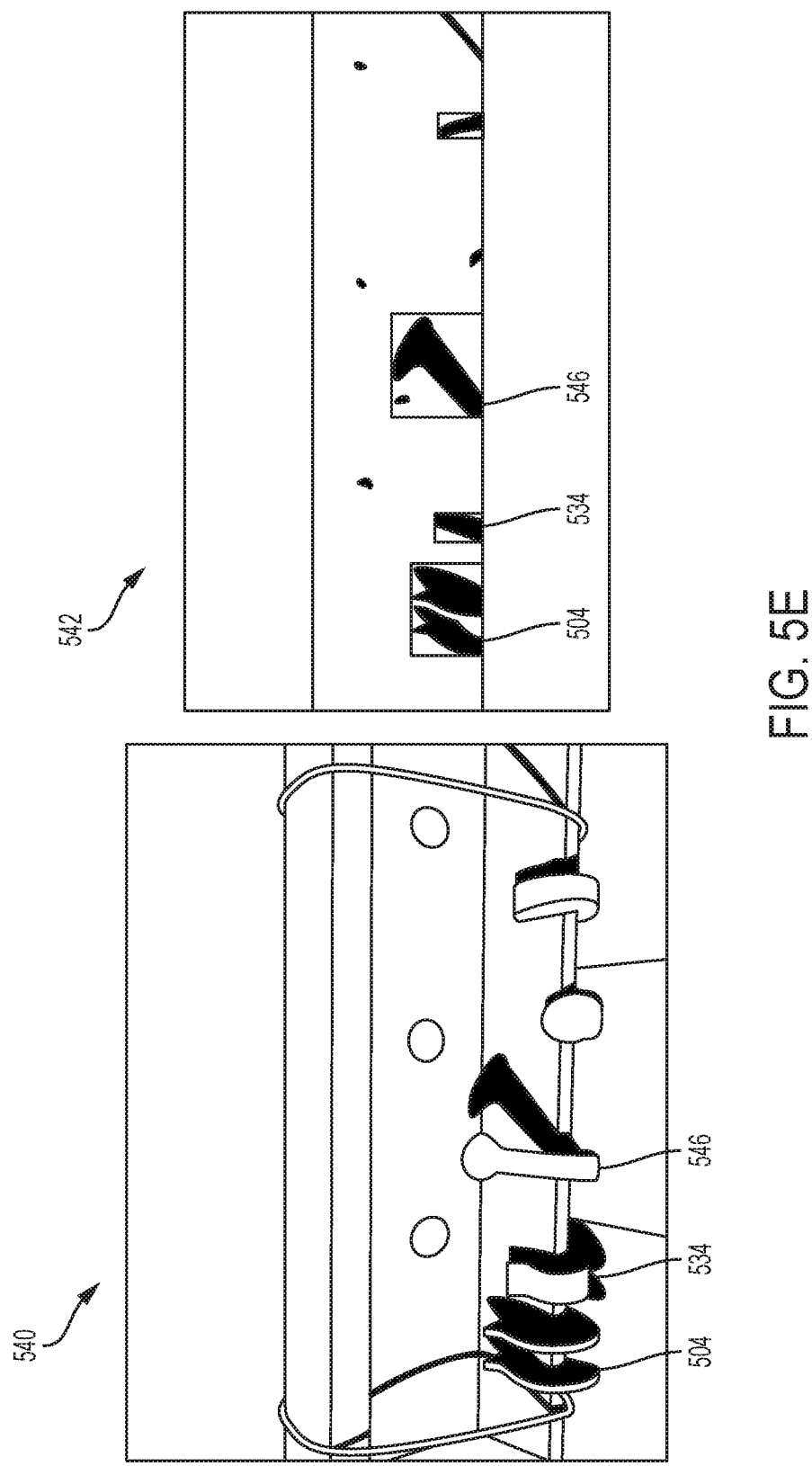
FIG. 5E illustrates an exemplary captured image and an associated processed image of a fifth anchor type according to the present disclosure.

FIG. 5E illustrates an exemplary captured image 540 and an associated processed image 542 of two different anchor types 504 and 534 as well as pulled spike 546 according to the present disclosure. The boxes in the processed image 542 indicate identified track features (e.g., an anchor and spike).

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

What is claimed is:

1. A railroad track feature detection system comprising:
   a camera configured to capture a plurality of images,
   one or more light sources; and
   a computing system comprising:
     at least one memory comprising instructions; and
     at least one processing device configured to execute the instructions, wherein the instructions cause the at least one processing device to perform operations comprising:
       receiving a first image of the plurality of images;

detecting one or more imaged rail features in the first image;
identifying a first rail feature of the one or more imaged rail features;
determining location information of the first rail feature; and
sending one or more instructions based on the location information of the first rail feature to cause a maintenance action to be performed on the first rail feature.

2. The railroad track feature detection system of claim 1, wherein the one or more instructions include instructions for a drone rail maintenance vehicle to repair the first rail feature.

3. The railroad track feature detection system of claim 1, wherein the one or more instructions include instructions for a drone rail maintenance vehicle to inspect the first rail feature.

4. The railroad track feature detection system of claim 1, wherein determining location information of the first rail feature includes global positioning system (GPS) coordinates.

5. The railroad track feature detection system of claim 1, wherein the operations further comprise:
receiving a second image of the plurality of images;
detecting one or more second imaged rail features in the second image;
identifying a second rail feature of the one or more second imaged rail features;
determining location information of the second rail feature; and
sending one or more second instructions based on the location information of the second rail feature to cause an action to be performed on the second rail feature.

6. The railroad track feature detection system of claim 5, wherein determining location information of the second rail feature includes measuring a distance between the first and second rail feature.

7. The railroad track feature detection system of claim 5, wherein the first and second rail feature includes an anchor, a spike, a rail tie, a tie plate, or a rail joint.

8. The railroad track feature detection system of claim 1, wherein the operations comprise storing feature identifiers and location information of the first and second rail features.

9. The railroad track feature detection system of claim 1, wherein the camera and the one or more light sources are coupled to a frame of a rail vehicle and positioned such that the plurality of images include a rail track.

10. A non-transitory computer readable medium comprising instructions that, when executed by a processor, causes the processor to:
receive a plurality of images from a camera coupled to a frame of a rail vehicle, the camera positioned such that the plurality of images contain a rail track;
detect a plurality of imaged rail features in the plurality of images;
identify the detected rail features and assign feature identifiers to each of the identified rail features;
detect and identify a color marker in the plurality of images;
based on the color marker, determine a first rail feature of the plurality of imaged rail features in need of maintenance; and
based on the determination, generate an alert.

11. The non-transitory computer readable medium of claim 10, wherein the instructions further cause the processor to generate instructions to repair the first rail feature.

12. The non-transitory computer readable medium of claim 11, wherein the instructions further cause the processor to send the instructions to repair the first rail feature to a drone rail maintenance vehicle.

13. The non-transitory computer readable medium of claim 10, wherein the feature identifiers include:
feature identification information that corresponds to one railroad track feature of a database of railroad track features; and
location information.

14. The non-transitory computer readable medium of claim 13, wherein the instructions further cause the processor to:
measure a distance between the first rail feature and a second identified rail track feature; and
wherein:
the first rail feature is contained in a first image of the plurality of images; and
the second identified rail track feature is contained in a second image of the plurality of images.

15. The non-transitory computer readable medium of claim 13, wherein the database of railroad track features includes an anchor, a spike, a rail tie, a tie plate, and a rail joint.

16. The non-transitory computer readable medium of claim 10, wherein the instructions further cause the processor to:
assign color identifiers to the identified color markers;
determine if the color marker is associated with a maintenance color; and
based on the determination, generate the alert.

17. The non-transitory computer readable medium of claim 16, wherein the color identifiers include:
color identification information that corresponds one railroad track features of a database of railroad track features; and
location information.

18. The non-transitory computer readable medium of claim 17, wherein the instructions further cause the processor to:
measure a distance between a first color marker and a second color marker; and
wherein:
the first color marker is contained in a first image of the plurality of images; and
the second color marker is contained in a second image of the plurality of images.

* * * * *